United States Patent [19]
Olson

[11] Patent Number: 6,157,351
[45] Date of Patent: Dec. 5, 2000

[54] THREE DIMENSIONAL DISPLAY ON PERSONAL COMPUTER

[75] Inventor: Peter Olson, Los Gatos, Calif.

[73] Assignee: I-O Display Systems, LLC, Menlo Park, Calif.

[21] Appl. No.: 08/909,710

[22] Filed: Aug. 11, 1997

[51] Int. Cl.[7] ........................................... G09G 5/00
[52] U.S. Cl. .................. 345/7; 345/139; 345/419; 348/42; 348/43; 348/51; 348/53; 382/285
[58] Field of Search ................................ 345/32, 35, 56, 345/139, 355, 418, 421, 7–9, 419; 348/42–60; 382/285

[56] References Cited

U.S. PATENT DOCUMENTS

| | | | |
|---|---|---|---|
| 4,875,034 | 10/1989 | Brokenshire | 340/721 |
| 5,181,133 | 1/1993 | Lipton | 359/84 |
| 5,281,957 | 1/1994 | Schoolman | 345/8 |
| 5,446,834 | 8/1995 | Deering | 395/127 |
| 5,523,886 | 6/1996 | Johnson-Williams et al. | 359/464 |
| 5,572,250 | 11/1996 | Lipton et al. | |
| 5,691,737 | 11/1997 | Ito et al. | 345/8 |
| 5,745,164 | 4/1998 | Faris | 348/60 |
| 6,088,052 | 7/2000 | Guralnick | 348/51 |

Primary Examiner—Richard A. Hjerpe
Assistant Examiner—Henry N. Tran
Attorney, Agent, or Firm—Renner, Otto, Boisselle & Sklar, LLP

[57] ABSTRACT

A system which can automatically display either regular two dimensional images or three dimensional images: The system includes, a processor which executes a program, a display, eye glasses which have electronically controllable lenses, and a detector unit connected between the processing unit and the display. Prior to displaying a three dimensional image, the processor sends a signal to the display which represents a particular bar code. The bar code indicates if the following three dimensional images will be displayed in page flip mode or in an interlaced mode. The detector unit detects the bar code and activates the special glasses so that the lenses in the glasses are alternatively opened and closed as frames are displayed. At the end of the three dimensional presentation, the processor sends another bar code to the display. The detector detects this bar code and the systems resumes normal two dimensional operation with both lenses in the glasses being open at all times. The present system can display a three dimensional "widow" on a screen which has normal two dimensional data. The three dimensional window is surrounded by a border which is detected by the detector unit and only the data within this border or window is displayed in three dimensional page flip or interlaced mode.

25 Claims, 3 Drawing Sheets

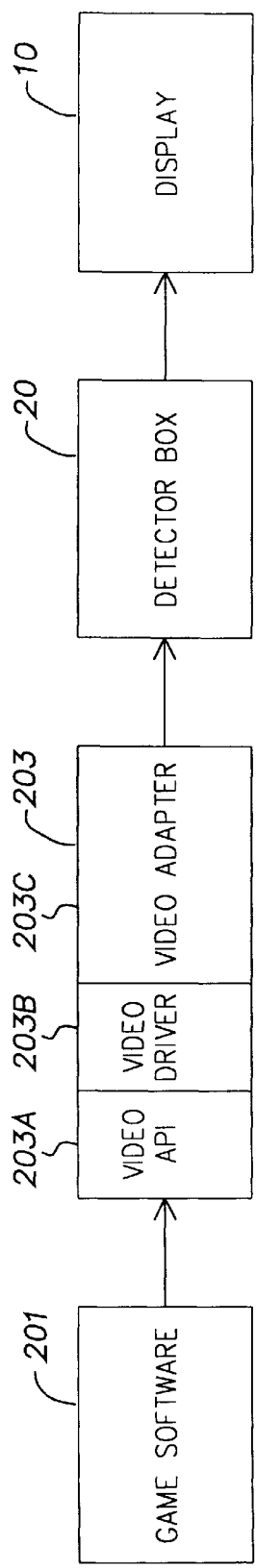
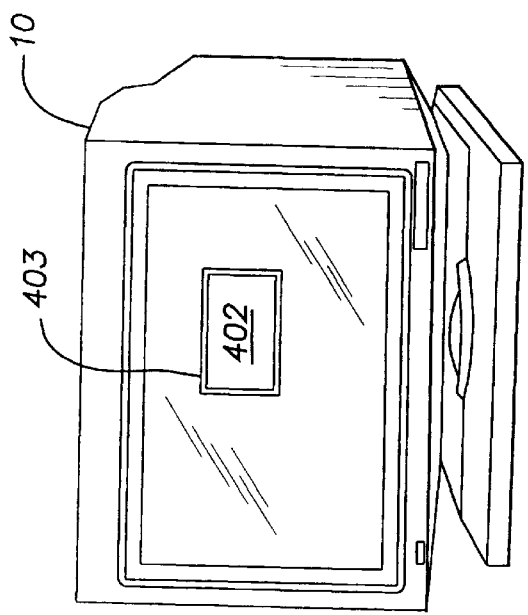

THREE DIMENSIONAL DISPLAY ON PERSONAL COMPUTER

FIELD OF THE INVENTION

The present invention relates to computer systems and more particularly to the display of three dimensional images utilizing a personal computer system.

BACKGROUND OF THE INVENTION

In general an individual uses both eyes to view objects or images. Due to the separation of our eyes, each eye views the world from a slightly different vantage point. The two views are combined by the human brain to allow one to perceive depth or three dimensions.

Computer displays or movie screens have no depth. Thus when viewing a computer display or movie screen both of an individual's eyes see the same image and there is no depth perception, that is, the individual does not perceive three dimensions in the image being viewed.

The art of presenting different images to the right and left eye of a viewer so that the viewer perceives a three dimensional image is well developed. Different images can be presented to each eye of a viewer using special eye glasses. One early system utilized polarized glasses, the lenses of which pass vertical polarized light to one eye and horizontally polarized light to the other eye. When a viewer is wearing such glasses, if correctly polarized images are projected, the viewer can perceive (i.e. see) a three dimensional image.

Other known systems utilize eye glasses which have lenses that can be electronically opened and closed. The lenses are alternatively opened and closed and appropriate images are alternatively projected on a screen or display in time sequence synchronized with the opening and closing of the lenses.

There are two type of systems that utilize such glasses. The first type of system displays images in what is often called "page flip mode". In page flip mode, right and left eye images are alternatively displayed. The right eye lens is opened to see one set of images and the left eye lens is opened to see the other set of images. The second type of system is generally referred to as an "interlaced" system". Interlaced systems display different images using the even and odd lines of the display. That is, a first image is displayed using the even numbered lines on the display and then a second image is displayed using the odd numbered lines on the display. The right eye shutter is opened for one image and the left eye shutter is opened for the second image.

SUMMARY OF THE INVENTION

Many computer systems are utilized for a variety of functions, programs and operations. It is desirable to have a system which can display three dimensional images and which can at other times be used for other purposes which involve display of conventional two dimensional images. Even with systems which are exclusively used for games, it is desirable to be able to use the system for both normal images and for three dimensional images.

The present invention provides a system which can automatically display either regular two dimensional images or three dimensional images. The system includes, a processor which executes a program, a display, eye glasses which have electronically controllable lenses, and a detector unit connected between the processing unit and the display. Prior to displaying a three dimensional image, the processor sends a signal to the display which represents a particular bar code. The bar code indicates if the following three dimensional images will be displayed in page flip mode or in an interlaced mode. The detector unit detects the bar code and activates the special glasses so that the lenses in the glasses are alternatively opened and closed as frames are displayed. At the end of the three dimensional presentation, the processor sends another bar code to the display. The detector detects this bar code and the systems resumes normal two dimensional operation with both lenses in the glasses being open at all times.

A further feature of the present invention is that it can be used to display a three dimensional "widow" on a screen which has normal two dimensional data. The three dimensional window is surrounded by a border which is detected by the detector unit and only the data within this border or window is displayed in three dimensional page flip or interlaced mode.

BRIEF DESCRIPTION OF THE DRAWINGS

FIG. 2 diagramatically shows the system components through which the data stream passes.

FIG. 4 shows a display with a window of three dimensional data.

DETAILED DESCRIPTION OF A PREFERRED EMBODIMENT

Figure 1:
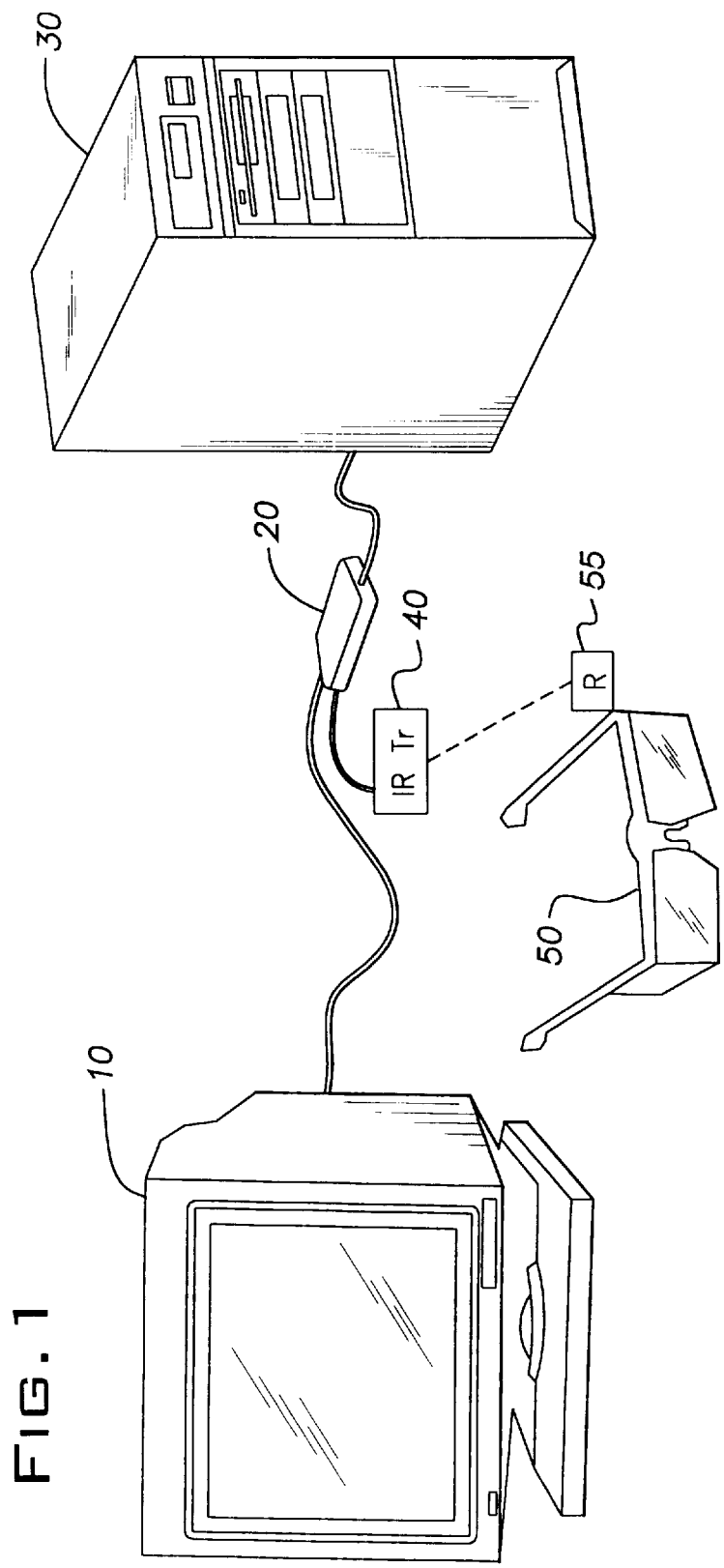
FIG. 1 is an overall drawing showing the major components in the system.

The main components of the system as shown in FIG. 1 include a conventional computer display 10, a special adapter 20, a conventional personal computer processing unit 30, an infra red signal transmitter 40 and a pair of eye glasses 50. The eye glasses 50 include lenses which can be electronically opened and closed. Signals which control operation of the lenses are transmitted to glasses 50 via an infra red signal link that includes transmitter 40 and receiver 55.

The system shown can display both two dimensional images on display 10 in a conventional manner and three dimensional images. When a program in processor 30 desires to initiate three dimensional operation, it first sends an image containing a special bar code to display 10. The special bar code is detected by unit 20 and three dimensional operation begins.

The system uses seven distinct bar codes. The seven bar codes are herein designed A to G and they have the following meaning:

Bar code A: start "Page Flip" three dimensional mode.

Bar Code B start "Pseudo Interlaced" three dimensional mode.

Bar Code C stop three dimensional operation and resume normal operation.

Bar Code D to G used to define the beginning and end of lines in a three dimensional widow in an otherwise two dimensional image (defined below).

Eye glasses 50 have two liquid crystal (LC) lenses which can be rendered opaque or transparent by electrical signals from unit 20. The two lenses in eye glasses 50 can be controlled independently. In three dimensional operation the lenses are alternatively opened and closed. That is, when the right eye is open the left eye is closed and vice versa. Eye glasses with liquid crystal lenses controllable via and IR link are known in the art.

The system can operate in either page-flip or interlaced mode. In page flip mode the images for the left and right eyes are alternatively displayed on the display 10. The left eye lens is opened for one frame of data on display 10 and then the right eye lens is opened for one frame of data on display 10.

In interlaced mode, the right eye image is displayed using the even lines on the display and the left eye image is displayed using the odd lines on the display. The right eye lens is opened with the right eye image is being displayed and the left eye lens is opened when the left eye image is being displayed. In interlaced mode, the processor transmits frames of data to unit 20 which have both the left and right eye images. As frames are received by detector 20, detector 20 first blocks the even lines in one frame and then it blocks the odd lines in the next frame, thereby creating the left and right eye images on display 10. While the type of operation describe above can be referred to as interlaced operation, it is more accurately described a "pseudo interlaced" since the display is not operating in a true interlaced mode. A truly interlaced display first actually receives from the processor an images for the even rows of the display and then it receives an image for the odd rows of the display. With the present invention the processor sends all lines in each frame and unit 20 blocks the even rows for one image and then the odd rows for a second image.

FIG. 2 shows the data flow in the system. Game or other software 201 generates images. These images go to a video API (application programming interface), and then to video drivers 203B which drive a video adapter 203C. The video adapter sends images to detector box 20 which in turn sends images to display 10. The game or other software 201 generates images for the right and left eyes which when combined create a three dimensional image. The technique for generating such right and left eye images is well known and it can utilize multiple cameras which take pictures of the same object or it can involve highly complex mathematical operations. With respect to the present invention the creation of the right and left eye images can follow the teaching in the prior art.

The images created by program 201 are supplied or sent to a standard software three dimensional API (application program interface) such as the three dimensional program interface provided by Microsoft entitled Direct 3D. The three dimensional API provides an input to system software which in turn supplies signals to video drivers 203B. The video drivers 203B interface with and drive the actual video adapter hardware 203 in the computer. These Video API 203A, the video drivers 203B and the video adapter 203C are conventional commercially available units. For example the Windows operating system marketed by Microsoft corporation has an API for three dimensional images and video drivers for most of the popular video adapter cards.

The mode of operation where a three dimensional image is presented in a window in an otherwise two dimensional screen is illustrated in FIG. 4. As shown in FIG. 4, the main part of the screen 401 is a conventional two dimensional image. The window 402 displays a three dimensional image. It should be understood that the window 402 can be any size and it can be located anywhere on the screen.

At the border 403 of the three dimensional window 402, each line has a bar code which tells the detector box 20 that the glasses need be opened and closed to display the image inside the window in three dimensions. Since only the image inside the window is a three dimensional image, the opening and closing of the lenses on the glasses 50 has a minimal impact on what the viewer sees in the remaining portions of the screen.

Figure 3:
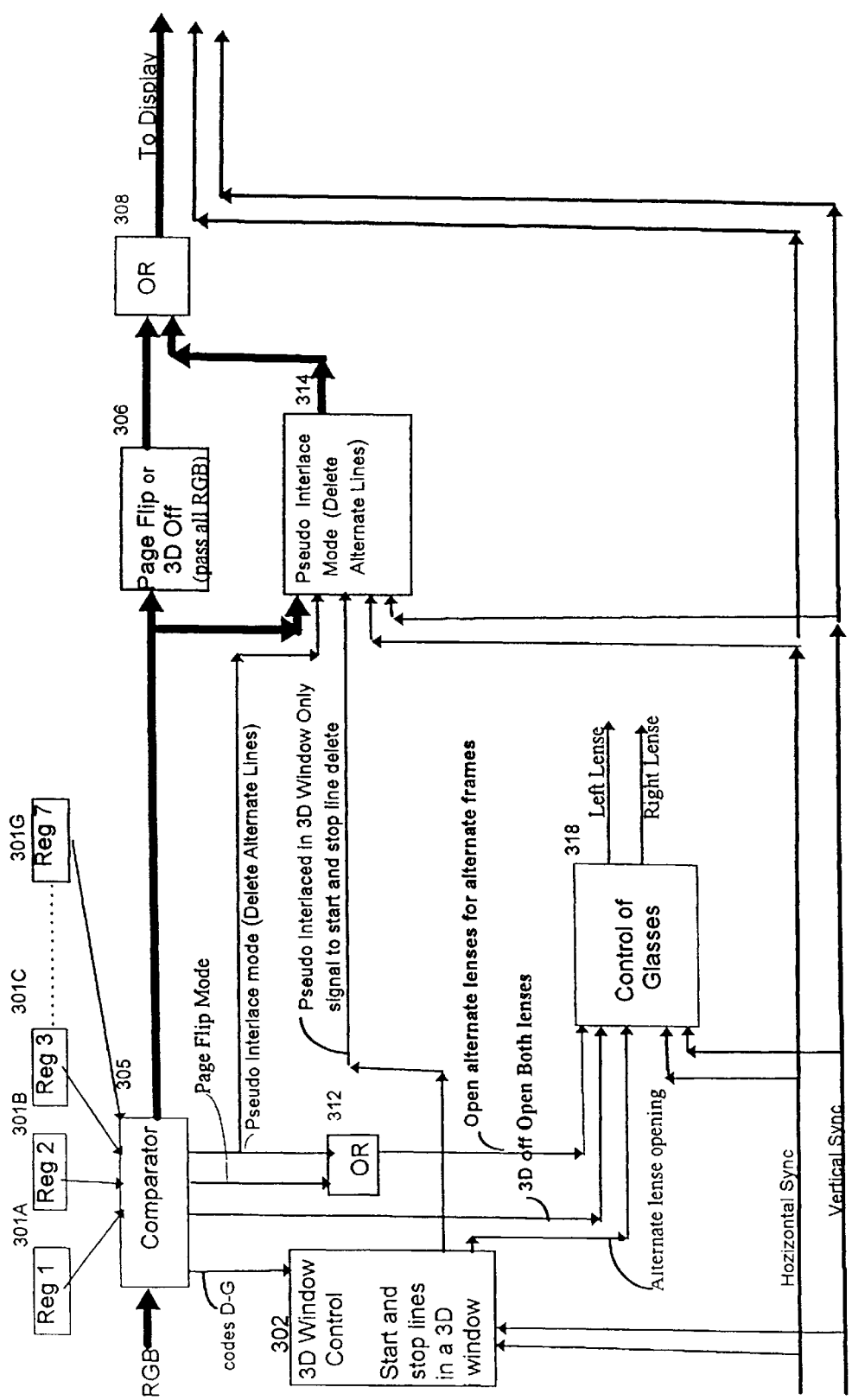
FIG. 3 is a block diagram of the detector unit.

The details of the unit 20 are shown in FIG. 3. This unit can be described as a detector and control unit. This unit detects the bar codes which the computer sends to the display and in response to the detection of codes it initiates and stops the operation of the three dimensional mode. Unit 20 receives the RGB (red green blue) signal and the vertical and horizontal sync signals from the computer 30, it appropriately modifies the RGB signals and it supplies the modified RGB signal and the horizontal and vertical sync signals to display 10. The paths of the RGB and horizontal and vertical sync signals through unit 20 are shown by the dark wide lines in FIG. 3. Unit 20 also sends signals to eye glasses 50 which open and close the lenses in these glasses.

As shown in FIG. 3, unit 20 includes seven registers 301A, to 301G which store the bit patterns that form the bar codes A to G. A comparator 305 examines the stream of bits in the RGB signals and it compares them to the bits in registers 301A to 301G. When a match is detected one of the output lines from the comparator 305 is activated. The codes cause activation of the following lines as follows:

Code A: activates "Page Flip Mode" line. The entire screen is placed in page flip mode until a stop signal received.

Code B: activates "Pseudo Interlaced Mode" line. The entire screen is placed in pseudo interlaced mode until a stop signal is received.

Code C: deactivates both "Page Flip Mode" and "Pseudo Interlaced Mode" lines.

Code D: sent to unit 302 to activate page flip mode in a window. That is, 3D line begins in a window at the point this code is received.

Code E: sent to unit 302 to stop page flip mode in a window. That is, a 3D line in a window using page flip mode ends at the point this code is received.

Code F: sent to unit 302 to activate pseudo interlaced mode in a window. That is, a 3D line in a window begins at the point where this code is received.

Code G: sent to unit 302 to stop pseudo interlaced mode in a window. That is, a 3D line in a window using pseudo interlaced mode ends at the point where this code is received.

When the page flip mode signal or 3D Off signal is activated the unit 306 passes the RGB signals to the display 10 through OR unit 308. When the Pseudo Interlaced Mode signal is active, unit 314 deletes alternate lines from alternate frames (as explained later this also occurs in a portion of a frame when there is an pseudo interlaced 3D window). When the Pseudo Interlaced Mode line is active (as a result of comparator 305 detecting a code B), unit 314 first detects a vertical sync signal and it then alternately passes and blocks lines as it receives each horizontal sync signal. This can be done by a flip flop which is triggered by the horizontal sync signal and the output of which controls a gate which blocks or passes the RGB signals. Circuit 306 passes the entire RGB signal when the system is operating in Page Flip Mode or when the 3D operation is not active. Stated differently, circuit 306 passes the entire RGB signal except when the system is operating in pseudo interlaced mode. When the system is operating in pseudo interlaced mode the RGB signals are passed to OR circuit 308 through unit 314 which deletes alternate lines from either the entire screen or from a window.

When the page flip mode or pseudo interlaced modes are in operation unit 318 which controls the lenses of the eyeglasses through unit IR transmit unit 40 is activated through OR circuitry 312. When active, unit 318 alternately opens (makes transparent) the right and left lenses for alternate frames of data. Signals from control unit 318 in unit 20 are transmitted to glasses 50 via IR transmit and receive units 40 and 55. IR transmit and receive units 40 and 55 are conventional.

The 3D window control unit 302 receives a signal when any one of the control codes D to G is detected by comparator 305. These control codes indicate to unit 302 when and where 3D operation in a window begins and ends. When the location of a 3D window moves, the position of these codes in the data stream naturally shifts.

When unit 302 receives a signal indicating that there is a 3D window, a signal is sent to unit 318 indicating that the right and left lenses should be opened for alternate frames. When unit 302 receives code F from comparator 305, a signal is sent to unit 314 indicating that alternative lines need be deleted from a window. It is noted that codes F and G appear at the border of a three dimensional image, hence they indicate where the deletion of alternate lines should begin and end.

In a situation where a 3D window is operating in page flip mode, the entire RGB signal is passed to the display and unit 302 merely needs send a signal to unit 318 to open and closes the eye glass lenses for alternate frames. The images which alternate in the window in order to create the 3D affect are generated in a conventional manner by the system software as previously described.

The actual series of bits which form each bar code can be choosen in an arbitrary manner. The length of the series of bits which form each code should be at least one byte long.

While the invention has been shown and described with respect to a preferred embodiment thereof, it should be understood that various changes in form and detail can be made without departing from the spirit and scope of the invention. The scope of applicant's invention is defined by the appended claims and equivalents thereto.

I claim:

1. A system which can display both two dimensional images and three dimensional images including,
    at least one pair of eye glasses, said eye glasses having lenses which can be electrically controlled to transparent and opaque states,
    a central processing unit which generates a series of bits representing a series of images and control codes,
    a display connected to said central processing unit to display said images,
    a detector means connected between said central processing unit and said display, said detector means including means to detect said control codes in said series of bits,
    means responsive to said detector means for controlling said lenses to transparent and opaque states for the display of three dimensional images when a particular one of said control codes is detected and for stopping such control of said lenses when a particular one of said control codes is detected,
    whereby said system can selectively display three dimensional images.

2. The system recited in claim 1 wherein said codes include a code indicating said three dimensional images are to be presented in page flip mode and a code indicating that said three dimensional images are to be presented in pseudo interlaced mode.

3. The system recited in claim 2, wherein said codes include a common code to cause cessation of page flip mode and pseudo interlaced mode.

4. The system recited in claim 1 wherein said detector means includes storage means for storing a plurality of series of bits representing control codes and a comparator which compares the bits in said storage means to the bits sent to said display to detect any control codes in the bits sent to said display.

5. The system recited in claim 1 wherein the lenses in said eye glasses are electrically controllable liquid crystal lenses which can be made opaque or transparent.

6. The system recited in claim 1 wherein said system includes a windows operating system which can display a plurality of windows on said display.

7. The system recited in claim 6 wherein codes to indicate a three dimensional image are positioned in a border around a window which includes a three dimensional image.

8. A computer system having and operating in accordance with a windows operating system, said computer system including,
    a display for displaying an image which includes a plurality of windows,
    a particular one of said windows alternatively displaying left and right eye images which together create a three dimensional image,
    said particular one of said windows having codes at the beginning and end of lines in said right and left eye images in said particular window,
    detector means for detecting said codes,
    at least one pair of eye glasses which have lenses which can be electrically controlled to transparent and opaque states,
    means responsive to said detector means for controlling said lenses to transparent and opaque states when a particular one of said codes is detected.

9. The system recited in claim 8 wherein said windows operating system is the Microsoft Windows operating system.

10. A windows based computer system which can display both two dimensional images and three dimensional images, said system including a central processor and a display, the display of a three dimensional image in either a window or as a full screen image being preceded by the display of a bar code, said system including,
    detector means connected between said central processor and said display to detect said displayable bar codes,
    at least one pair of eye glasses which have lenses which can be electrically controlled to transparent and opaque states,
    means responsive to said detector means for controlling said lenses to transparent and opaque states in response to the detection of said bar codes,
    whereby said system can be used to display both two dimensional and three dimensional images by sending to said display appropriate bar codes which also are displayed.

11. The system recited in claim 10 wherein said codes include a code indicating said three dimensional images are to be presented in page flip mode and a code indicating that said three dimensional images are to be presented in pseudo interlaced mode.

12. The system recited in claim 11, wherein said codes include a common code to cause cessation of page flip mode and pseudo interlaced mode.

13. The system recited in claim 10 wherein said windows based computer system is operating in accordance with the Microsoft Windows operating system.

14. A method of providing information to a display apparatus to indicate a characteristic of display apparatus operation, comprising supplying to the display apparatus a displayable bar code representative of such characteristic of display apparatus operation.

15. The method of claim 14, wherein the display apparatus is responsive to image data to display images representative of at least some of such data, and wherein said supplying comprises supplying such bar code with such image data.

16. The method of claim 15, wherein said supplying comprises supplying such bar code as a part of such image data.

17. The method of claim 14, said supplying comprising selectively supplying to the display apparatus a bar code to render operation of the display apparatus in three-dimensional display mode and a bar code to render operation of the display apparatus from three-dimensional display mode to two dimensional display mode.

18. The method of claim 17, said selectively supplying comprising supplying the display apparatus respective bar codes to render operation of the display apparatus respectively in page-flip three dimensional display mode or in pseudo interlaced three dimensional mode.

19. A data structure comprising a bar code, said bar code including an arrangement of data representing an operational characteristic of a display apparatus for selectively displaying information in two dimensional mode or three dimensional mode.

20. The data structure of claim 19, wherein said bar code is part of image data, at least some of such image data intended for display by the display apparatus.

21. The data structure of claim 19, wherein said bar code is able to be displayed on a display.

22. A system which can display both two dimensional images and three dimensional images including, a display to display said images, an input unit which couples to the display image information and control codes in the form of data representing displayable bar codes representing the start of display operation to display images for three dimensional viewing and the type of three dimensional display format and data representing the cessation of display operation from displaying images for such three dimensional viewing, a detector between said input unit and said display to detect the control codes, and a device responsive to said detector for providing, when needed for three dimensional viewing, an output for controlling shutters to transparent and opaque states for viewing displayed three dimensional images, whereby said system can selectively display three dimensional images.

23. A method for selectively displaying two dimensional images and three dimensional images including, supplying a series of bits representing a series of images and control codes, wherein the control codes represent whether displayed images are two dimensional or three dimensional, displaying images on a display, detecting control codes in said series of bits, in response to detecting a given control code, commencing and continuing to controlling respective shutters to transparent and opaque states for the display of three dimensional images and in response to detecting a given control code stopping such control of such shutters, thereby selectively to display three dimensional images.

24. The method of claim 23, further comprising supplying such control codes to represent the type of three dimensional operation.

25. A method for operating a computer system having and operating in accordance with a windows operating system, said computer system including, displaying images which includes a plurality of windows, in a particular one of said windows alternatively displaying left and right eye images which together create a three dimensional image, supplying with data for such respective left and right eye images in the said particular one of said windows, codes at the beginning and end of lines in said right and left eye images in said particular window, detecting said codes, at least one pair of eye glasses which have lenses which can be electrically controlled to transparent and opaque states, controlling said respective lenses in out of phase relation to transparent and opaque states when a particular one of said codes is detected.

* * * * *